United States Patent Office 3,468,641
Patented Sept. 23, 1969

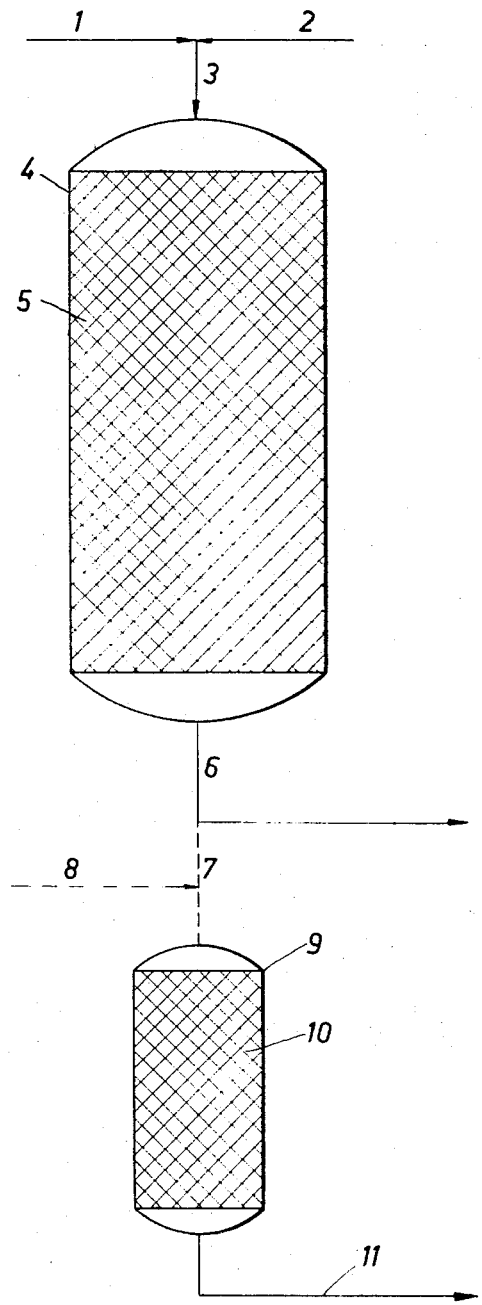

3,468,641
CONVERSION OF LIQUID HYDROCARBONS INTO FUEL GAS OR WATER GAS BY A THERMAL OR CATALYTIC SPLITTING
Hans Werner Gross, Buchschlag, Erwin Ehrhardt, Sprendlingen, and Gerhard Baron, Frankfurt, Germany, assignors to Metallgesellschaft Aktiengesellschaft, Frankfurt am Main, Germany
Filed May 2, 1966, Ser. No. 546,666
Int. Cl. C10g *11/28*
U.S. Cl. 48—214                     13 Claims

ABSTRACT OF THE DISCLOSURE

A process of producing a gas having a high methane content by a hydrogenating splitting of hydrocarbons under at least atmospheric pressure, comprising supplying hydrocarbons containing 3-30 carbon atoms per molecule and steam in a mixture at a temperature up to 450° C. to a first bed of a catalyst having a hydrogenating splitting promoting activity, withdrawing split gases containing higher hydrocarbons from said first bed and passing them through a second bed of a catalyst having a hydrogenating splitting promoting activity and present in an amount which is 10-25% of the amount of said catalyst in said first bed, withdrawing split gases from said second bed, and controlling the temperature of said second bed at a value which is sufficiently higher than the temperature of said split gases withdrawn from said first bed to keep the concentration of higher hydrocarbons in the split gases withdrawn from said second bed below 8 grams higher hydrocarbons per standard cubic meter of split gas.

---

It is known to convert liquid hydrocarbons into fuel gas or water gas by a thermal or catalytic splitting in the presence of gases which contain water vapor and/or oxygen. Such gases are, e.g., air or technically pure oxygen.

The thermal or thermal-catalytic splitting of hydrocarbons known as cracking, which is carried out without admixture or with an admixture of small amounts of steam, results also in a gas fraction which consists of hydrogen and $C_2$ to $C_4$ hydrocarbons and has a high calorific value. This process cannot be considered a complete conversion because it results preferably in low-boiling liquid hydrocarbons and in coke.

Liquid hydrocarbons may be converted into water gas consisting mainly of CO and $H_2$ by an oxygenating splitting with oxygen or by splitting with oxygen and steam. The need to use pure oxygen in the production of nitrogen-free product gases may be an economical disadvantage.

The splitting in the presence of oxygen has the advantage that an indirect supply of heat is not required and that the process can be carried out in a stack or shaft furnace. For a catalytic splitting of liquefied gases or of liquid hydrocarbons only with steam, with an exclusion of free oxygen or free hydrogen, an indirect supply of heat is required. For this reason, this process is carried out in tubular heaters. This process has been preferred when a nitrogen-free product gas is to be obtained without using free oxygen. Such gas may be, e.g., water gas, which may be converted into hydrogen by a conversion of its carbon monoxide content with steam to form carbon dioxide, which is then removed by scrubbing.

An object which has recently become highly interesting is the conversion of liquid hydrocarbons to rich gases having a high methane content. For a distribution of fuel gas over large areas by a long-distance gas supply system it is highly important that the gas which is being conveyed should have a high calorific value per unit of volume.

A known process of producing gases having a high calorific value is carried out in a plurality of stages and uses pure oxygen as a splitting agent in one or two stages. Another known process is a cyclic process carried out under atmospheric pressure. In the latter process, the required heat is supplied by a regenerative system. This process results in undesired by-products, which are partly liquid, particularly when the operation of the regenerative system is being reversed. In another known process, which is suitable for continuous operation, light, low-boiling hydrocarbons are cracked under atmospheric or superatmospheric pressure in a hot gas having a high content of free hydrogen. This process results also in undesired liquid by-products, particularly aromatic compounds, such as benzene, toluene, naphthalene and the like.

The Printed German Application No. 1,180,481 describes a continuous process of producing gases having a high methane content by a catalytic splitting of hydrocarbons containing 4-10 carbon atoms per molecule. In this process, the hydrocarbons are mixed under normal or elevated pressure with hydrogen and are heated to a temperature which is in the range of 350–500° C. and selected so that the heat of reaction results in a temperature of 400–550° C. in the bed of the nickel-containing catalyst. It is preferable to use pressures between 10 and 25 kg./sq. cm. (absolute pressure) and a ratio of 2–5 parts steam to one part hydrocarbon on a weight basis. In this process, a sequential reaction takes place, in which a major part of the mixed liquid hydrocarbons is first reacted with steam to form hydrogen and carbon monoxide, whereas the remainder is split to form methane and carbon dioxide. The carbon monoxide and residual steam may then form carbon dioxide and hydrogen in a water gas reaction. Carbon monoxide and hydrogen may also react to form methane.

Thermodynamic and reaction-kinetic considerations show that this process can be performed only in a narrow range of operating conditions owing to its heat balance. This theoretical analysis has been confirmed in practice (R. G. Cockerham and G. Percival, 147th National Meeting of the American Chemical Society, 1964).

The mixed hydrocarbons to be gasified must consist mainly of low-boiling hydrocarbons. When a mixture consisting mainly of $C_7$ to $C_{10}$ hydrocarbons is reacted with steam on the catalyst, the required temperature can be maintained in the catalyst bed only if the reaction mixture is preheated to such a high temperature that cracking reactions are obtained independently of the added steam. These cracking reactions reduce the reactivity of the feedstock and the activity of the catalyst and may finally lead to a deposition of carbon black. A preheating to a higher temperature will promote also the endothermic reactions taking place in the catalyst bed and yielding carbon monoxide and hydrogen. These reactions cause a decrease of the temperature in the catalyst bed. Upon a decrease of the catalyst temperature, the relative surplus of carbon monoxide causes a formation of carbon and carbon dioxide (Boudouard equilibrium) because the known catalysts having a high nickel content promote the Boudouard reaction more than the homogenous water-gas reaction.

Reactions of mixed hydrocarbons containing a larger number of carbon atoms per molecule are accompanied by secondary reactions, which can be controlled only with difficulty and which result in a formation of polymers and carbon black. These secondary reactions reduce the life of the catalyst and create a need for frequent shut-downs. Such disturbances may be avoided when the hydrocarbon mixture to be gasified is preheated to a temperature not exceeding 450° C., independently of its boiling range and its end point, before it is introduced into the splitting catalyst. The preheating temperature depends on the boiling characteristics of the feed hydrocarbons and the rate at which steam is admixed. The preheating temperature is lower, the higher the average number of carbon atoms per molecule of the mixed hydrocarbon feed, and the preheating temperature is lower, the lower the rate at which steam is admixed.

When a steam-gasoline weight ratio of 2.5:1 is used in splitting a gasoline having a boiling range of 35–180° C. and the steam-gasoline mixture is preheated to 450° C., the exit temperature of the split gas from the catalyst bed will be about 480° C. Under these operating conditions, a fresh catalyst having a high nickel content of, e.g., 30–40% on a support of magnesium silicate or alumina exhibits in most cases a satisfactory performance for some weeks. The condensate which is obtained when the split gas is cooled is entirely free of hydrocarbons, and the split gas itself contains higher hydrocarbons only in amounts of about 0.1–0.6 gram per standard cubic meter. This shows that the hydrocarbon feed is virtually completely split. In this specification and the claims, the term "higher hydrocarbons" is used to describe hydrocarbons having 3 or more carbon atoms per molecule. After a relatively long period of operation, which may amount to about 2–3 months, which depends mainly on the catalyst support and the conditions under which the catalyst was manufactured, the activity of the catalyst declines. This is initially indicated by an increase of the contents of higher hydrocarbons in the split gas. As the operation proceeds further, the activity of the catalyst declines to such an extent that hydrocarbons are condensed when the gas is cooled to ambient temperature. Experiments have shown that this decline in activity is mainly due to a recrystallization of the nickel on the catalyst. Whereas this loss in activity may be compensated to some extent by raising the temperature of the catalyst bed by 5–10° C., this effect is obtained only for a comparatively short time. The temperature of the catalyst bed may be raised by an increase of the entrance temperature of the steam-gasoline mixture or by an indirect heating of the catalyst, e.g., with superheated process steam. In the latter case, the catalyst is accommodated in tubes of a tubular heater. If the exit temperature of the split gas from the catalyst is higher than 550° C., thermodynamical effects give rise to the formation of a gas which consists mainly of carbon monoxide and hydrogen and corresponds in its properties to the known gases for town or long-distance supply systems but can no longer be described as a rich gas.

Whereas the activity of the catalysts may be temporarily improved by the above-mentioned raising of the temperature, this results in an even higher crystallization rate of the nickel so that the life of the catalysts is not substantially increased.

Surprisingly it has now been found that when the exit temperature of the split gas from the catalyst is maintained constant, e.g., at 480° C., the activity of the catalyst does not decline in proportion with time but an appreciable decline in activity during the first 1000 to 2000 operating hours is followed by an operating period of many months, in which the activity of the catalyst is no more changed. Depending on the composition of the catalyst, the amount of higher hydrocarbons which flow through the catalyst bed without being split in this period amount to 3–30 grams per standard cubic meter of split gas. This corresponds to about 0.5–5% of the hydrocarbon feed. This proportion of higher hydrocarbons in the produced rich gas is excessively high for many uses. Under the operating conditions of long-distance gas lines, involving a superatmospheric pressure of 5–12 kg./sq. cm. (absolute pressure) and low temperatures, e.g., 0° to −5° C. and lower, hydrocarbons may condense in the long-distance line and this condensate may cause the known disturbances in the supply of gas over long distances.

It has been found that the life of such splitting plant can be considerably prolonged if the unsplit or incompletely split, higher hydrocarbons contained in the split gas after the initial decline in activity of the catalyst are completely split in a succeeding reactor, which contains a hydrogenating splitting catalyst in an amount which is only 10–25% of the amount of catalyst in the main reactor. When the activity of this succeeding catalyst declines, the temperature only of the latter is increased in dependence on the content of higher hydrocarbons in the split gas discharged from said succeeding catalyst until the concentration of carbon monoxide and hydrogen increases to such an extent that the succeeding catalyst must be replaced.

The invention relates to a process of producing gases having a high methane content by a hydrogenating splitting of hydrocarbons containing 3–30 carbon atoms per molecule under atmospheric or superatmospheric pressure on catalysts which contain nickel or cobalt, in the presence of steam and, if desired, in the presence of hydrogen or of gases which contain free hydrogen, in which process a mixture of hydrocarbons and steam is preheated to and is introduced into the catalyst bed at a temperature not exceeding 450° C.

This process comprises two stages. The second of these stages is carried out at a higher temperature than the first.

This process is characterized in that the split gas which contains higher hydrocarbons after an initial decline in activity of the catalyst is passed through an after-reactor, which contains a hydrogenating splitting catalyst in an amount of 10–25% of the amount of catalyst in the preceding reactor, and the temperature of the catalyst in the after-reactor is increased, suitably in steps, above the exit temperature of the split gas from the first splitting stage, so that the concentration of higher hydrocarbons in the end gas is kept below a predetermined value.

The temperature of the catalyst may be increased by indirect external heating. For this purpose, the catalyst is arranged in a tubular heater. Alternatively, the temperature increase may be effected by an addition of a small amount of air to the rich gas produced in the first stage so that the heat of the exothermic reaction of oxygen with the rich gas and/or with the residual hydrocarbons in the aftersplitting reactor results in the desired temperature increase.

The aftersplitting may be promoted by the same cobalt- or nickel-containing catalyst which is also used in the main reactor. This catalyst may contain, e.g., 20–40% cobalt or nickel on a support of magnesium silicate or alumina. It has been found desirable to add chromium, platinum, palladium or tungsten as stabilizers to these catalysts.

The process according to the invention will be explained more fully hereinafter in an example and with reference to the single figure of the accompanying drawing.

EXAMPLE

Gasoline is to be converted into a high-methane gas in a plant having a flow scheme as shown on the drawing. The gasoline has the following properties:

Boiling range _____ ° C__ 35–180
Carbon _____ percent by wt__ 84.75
Hydrogen _____ do____ 15.25
Paraffins, about _____ percent__ 93.5
Aromatic compounds, about _____ do____ 5.1
Olefins, about _____ do____ 1.4
Naphthalene, about _____ p.p.m__ 20
Density (20° C.) _____ g./cm.$^3$__ 0.7155

2.5 kg. steam are introduced through conduit 2 per kilogram of this gasoline supplied through conduit 1. Gasoline and steam are preheated so that the temperature of the mixture of these two substances in conduit 3 is 450° C. At this temperature, the mixture enters the catalyst bed 5 contained in the reactor 4. The gasoline should not be heated to a temperature above 450° C. at any time before contacting the catalyst.

The split gas exits from the catalyst bed through conduit 6 at a temperature of 480° C. This split gas has the following composition on a dry basis:

| | Percent by vol. |
|---|---|
| $CO_2$ | 22.4 |
| CO | 0.6 |
| $H_2$ | 16.9 |
| $CH_4$ | 60.1 |
| | 100.0 |

During the first three to four weeks of operation, the unsplit hydrocarbons in the rich gas amounted to 0.2–0.4 gram per standard cubic meter of gas and had the following composition:

| Hydrocarbons: | Percent by wt. |
|---|---|
| $C_5$ | 6.0 |
| $C_6$ | 51.0 |
| $C_7$ | 25.0 |
| $C_8$ | 13.0 |
| Benzene | 5.0 |

Other hydrocarbons could not be detected by gas chromatography.

After the usual removal of the carbon dioxide by scrubbing to a residual concentration of about 2%, a rich gas for distribution in long-distance supply systems or town gas systems is available with the following composition of its gaseous components:

| | Percent by vol. |
|---|---|
| $CO_2$ | 1.8 |
| CO | 0.8 |
| $H_2$ | 21.4 |
| $CH_4$ | 76.0 |

The small content of higher hydrocarbons in this gas is not disturbing.

After five months of operation, the proportion of higher hydrocarbons in the rich gas had increased to 6.2 grams per standard cubic meter. In other respects, the analysis of the gas had not changed. These higher hydrocarbons had the following composition:

| Hydrocarbons: | Percent by wt. |
|---|---|
| $C_5$ | 3.0 |
| $C_6$ | 15.0 |
| $C_7$ | 15.0 |
| $C_8$ | 12.0 |
| $C_9$ | 25.0 |
| $C_{10}$ | 22.0 |
| Benzene | 4.0 |
| Toluene | 4.0 |

Higher hydrocarbons having this composition are tolerable in a gas for long-distance supply up to an upper limit of about 8 grams per standard cubic meter.

When the exit temperature of the rich gas from the catalytic reactor 4 was increased by external heating by about 10° C., the proportion of higher hydrocarbons in the rich gas was temporarily reduced to the original value of 0.2–0.4 gram per standard cubic meter. After a total operating time of 8 months and at a gas exit temperature of 520° C., liquid hydrocarbons penetrated the catalyst bed in such an amount that the cooling of the rich gas resulted in a condensate which contained hydrocarbons. Shortly before the plant was shut down, the rich gas contained 18 grams higher hydrocarbons per standard cubic meter.

The experiment was repeated. After five months of operation under the same conditions, the reaction temperatures were not increased but an aftersplitting reactor 9 having a catalyst charge 10 was put into operation and fed through conduit 7. The catalyst was the same as that in the layer 5 of reactor 4. The amount of catalyst in reactor 9 was only 20% of the amount of catalyst in reactor 4. The gas analysis remained the same when the aftersplitting reactor had been put into operation but the proportion of higher hydrocarbons in the rich gas dropped to 0.2–0.4 gram per standard cubic meter.

Only after seven further months of operation, the resulting rich gas contained 5–7 grams higher hydrocarbons per standard cubic meter whereas the gas analysis was almost unchanged.

When the reaction end temperature in the aftersplitting reactor 9 was increased in small steps, the concentration of higher hydrocarbons in the rich gas was maintained below 3 grams per standard cubic meter for further four months. The catalyst in the after-reactor was then exchanged.

With a single exchange of the catalyst in the aftersplitting reactor 9, the life of the catalyst in reactor 4 was prolonged to 26 months.

In the plant illustrated by the flow scheme, the temperature increase in the aftersplitting reactor was effected by an addition of a small amount of air through the conduit 8 into the transfer conduit 7 between the two reactors.

Alternatively, the after-reactor 10 may consist of a tubular heater, the tubes of which contain the catalyst. These tubes are heated by superheated process steam, which flows around the tubes and is then supplied to the reactor 5 through conduit 2.

What is claimed is:

1. A process of producing a gas having a high methane content by a hydrogenating splitting of hydrocarbons under at least atmospheric pressure, said process comprising supplying hydrocarbons containing 3–30 carbon atoms per molecule and steam in a mixture at a temperature up to 450° C. to a first bed of a catalyst having a hydrogenating splitting promoting activity, withdrawing split gases containing higher hydrocarbons from said first bed and passing them through a second bed of a catalyst having a hydrogenating splitting promoting activity and present in an amount which is 10–25% of the amount of said catalyst in said first bed, withdrawing split gases from said second bed, and controlling the temperature of said second bed at a value which is sufficiently higher than the temperature of said split gases withdrawn from said first bed to keep the concentration of higher hydrocarbons in the split gases withdrawn from said second bed below 8 grams higher hydrocarbons per standard cubic meter of split gas.

2. A process as claimed in claim 1, which comprises initially supplying hydrocarbons containing 3–30 carbon atoms per molecule and steam in a mixture at a temperature up to 450° C. to said first bed when the same has a hydrogenating splitting promoting activity which is sufficiently high to cause said hydrocarbons to be split to such an extent that split gases withdrawn from said first bed contain higher hydrocarbons in a concentration below 8 grams higher hydrocarbons per standard cubic meter of split gas, and beginning to pass split gases withdrawn from said first bed through said second bed when said split gases withdrawn from said first bed contain higher hydrocarbons in a concentration which exceeds 8 grams higher hydrocarbons per standard cubic meter of split gas, due to a decline of said activity of said catalyst in said first bed.

3. A process as set forth in claim 1, in which said mixture contains hydrogen.

4. A process as set forth in claim 1, in which said mixture contains hydrogen-containing gases.

5. A process as set forth in claim 1, in which said catalyst in at least one of said beds comprises a substance selected from the class consisting of cobalt and nickel.

6. A process as set forth in claim 1, in which at least one of said beds is maintained under a superatmospheric pressure.

7. A process as set forth in claim 1, in which said temperature of said second bed is increased in steps in intervals of time.

8. A process as set forth in claim 1, in which said hydrocarbons in said mixture comprise gasoline.

9. A process as set forth in claim 1, in which the supply of said mixture is interrupted when the temperature of said second bed required to keep the concentration of higher hydrocarbons in the split gases withdrawn from said second bed below 8 grams higher hydrocarbons per standard cubic meter of split gas, is above 550° C., whereafter said catalyst in said second bed is replaced by a fresh catalyst having a hydrogenating splitting promoting activity and the supply of said mixture is then resumed.

10. A process as set forth in claim 1, in which the temperature of said second bed is controlled by adding oxygen to said split gases withdrawn from said first bed before said split gases are passed through said second bed.

11. A process as set forth in claim 10, in which said oxygen is added in the form of air.

12. A process as set forth in claim 1, in which said second bed is maintained in a plurality of tubes and the temperature of said second bed is controlled by a supply of external heat to said tubes.

13. A process as set forth in claim 12, in which the outside of said tubes is contacted with flowing superheated steam, which is subsequently used to form said mixture.

References Cited

UNITED STATES PATENTS

| | | |
|---|---|---|
| 3,089,843 | 5/1963 | Eastman et al. __ 208—107 XR |
| 3,128,163 | 4/1964 | Weittenhiller et al. _ 48—213 XR |

FOREIGN PATENTS

| | | |
|---|---|---|
| 1,131,350 | 6/1962 | Germany. |
| 1,145,586 | 3/1963 | Germany. |

MORRIS O. WOLK, Primary Examiner

J. OLSEN, Assistant Examiner

U.S. Cl. X.R.

23—288; 48—212, 213, 215; 208—108